May 28, 1968      I. A. ELLMAN      3,385,188
CAMERA CLOSE-UP ATTACHMENT
Original Filed Oct. 4, 1965      2 Sheets-Sheet 1
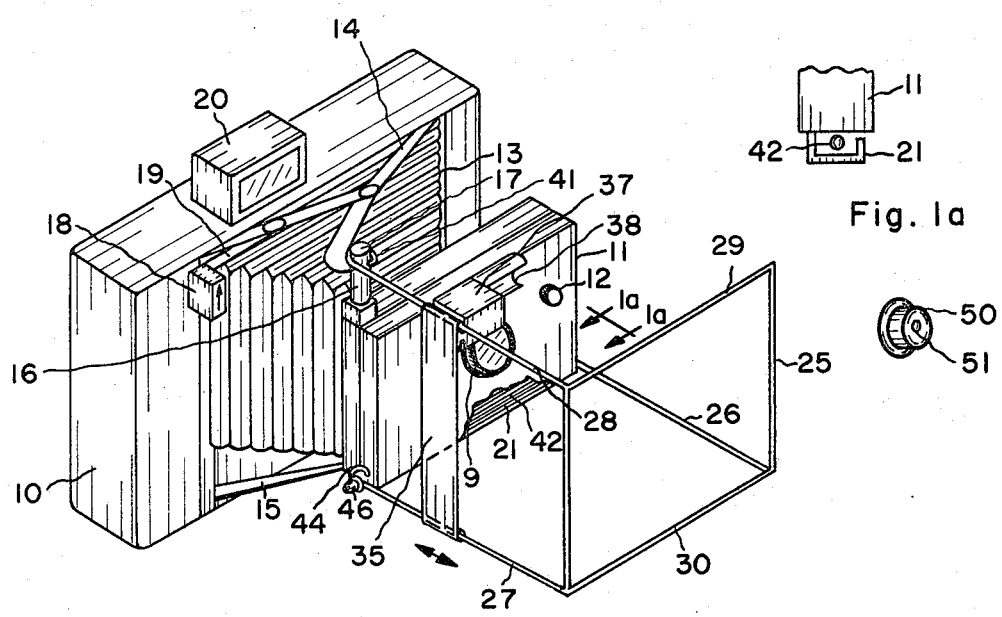
Fig. 1
Fig. 1a
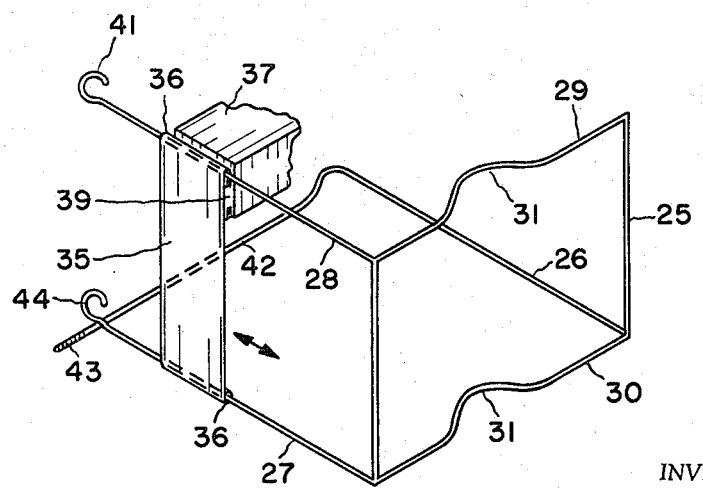
Fig. 2
INVENTOR.
I. A. ELLMAN
BY
ATTORNEY

United States Patent Office 3,385,188
Patented May 28, 1968

3,385,188
CAMERA CLOSE-UP ATTACHMENT
Irving A. Ellman, 1624 Sherbourne Road,
Valley Stream, N.Y. 11580
Original application Oct. 4, 1965, Ser. No. 492,420.
Divided and this application Apr. 3, 1967, Ser. No. 656,961
8 Claims. (Cl. 95—11)

ABSTRACT OF THE DISCLOSURE

A close-up attachment for a camera having a front portion with dimensions that approximately define the camera's field of view. The attachment has a generally rectangular front portion and a plurality of rearwardly extending elements for removably connecting the attachment to a camera. At least two of the rearwardly extending elements are interconnected by a clamping device which permits the attachment to be clamped to a camera and also carries a flashlamp for illuminating an object being photographed.

---

This application is a division of application Ser. No. 492,420, filed Oct. 4, 1965, and now abandoned.

This invention relates to a close-up attachment for a camera, especially for use in medical and dental photography, and to a method of operating the camera to obtain close-up color photographs with large depth of field.

In dental photography, it is frequently desirable to take photographs of the mouth showing the condition of the teeth and the gums before and after treatment. For this purpose, there are available close-up cameras specially designed for dental or medical use. These are, however, quite expensive, and often fail to provide a good color photograph with ample depth of field enabling the whole mouth region including front and back teeth and gums to appear in sharp focus.

The main object of my invention is to provide an attachment which may be simply attached to an inexpensive camera for close-up photographs.

Another object of the invention is to provide an inexpensive close-up attachment for a Polaroid Automatic Land camera enabling close-up color photographs to be taken.

Still a further object of my invention is a method of operating a Polaroid Automatic Land or similar type camera to obtain close-up color photographs with large depth of field.

These and other objects of my invention as will appear hereinafter are achieved by providing a wire frame constructed for ready attachment to the camera body and defining the camera's field of view and provided with a movable lock or clamp which locks the frame onto the camera body. A further feature of the invention is to mount a flashgun accessory onto the clamp whereby it is properly positioned for illuminating the desired area to be photographed when the clamp is in its locking position. Proper adjustment of the camera lens speed together with a special diaphragm or cover for the electric eye enables the required depth of field and exposure time to be obtained ensuring a sharply focussed picture in color of the entire mouth region.

Several examplary embodiments of my invention will now be described in greater detail with reference to the accompanying drawing wherein:

FIG. 1 is a perspective view showing my close-up attachment mounted on a Polaroid Land camera;

FIG. 1a is an end view of the bottom of the camera front showing a portion of the wire frame seated in the bottom channel;

FIG. 2 is a perspective view of the attachment alone of FIG. 1;

Figure 3:
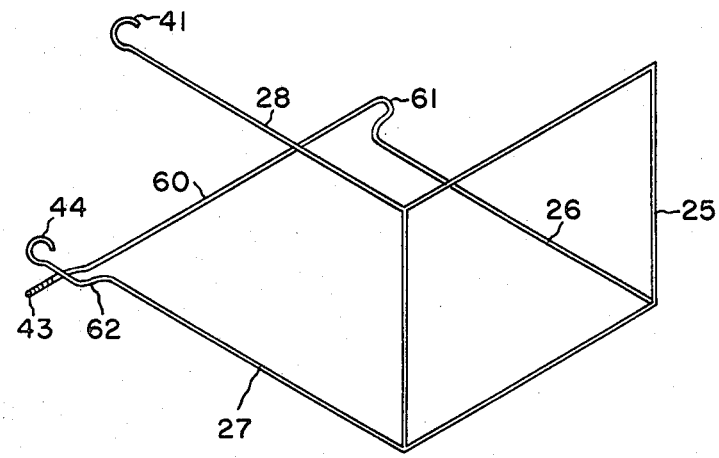
FIGS. 3 and 4 are perspective views of modifications.

Referring now to the drawing, FIG. 1 shows in perspective the pertinent parts of a model 104 Polaroid Land camera. It comprises a housing 10 whose rear contains provision for receiving a film pack. The camera front 11, which supports the lens 9 and the electric eye 12, is connected by a light-tight bellows 13 to the housing 10. The front 11 is supported by brackets 14 and 15 on the top and bottom, respectively. A rigid upstanding post 16 extends from the top of the camera front and is used to open and close the camera. The forward end of the top bracket 14 is pivoted on the post 16, but a short portion of it on top, about ¼ inch long and shown at 17, is free. This serves to anchor the upper part of my novel frame. That same portion 17 is used in conjunction with a rangefinder pushbotton 18 and the adjacent bracket 19 to lock the camera front in the closed position. The camera view-rangefinder is shown at 20. At the bottom of the camera front and extending horizontally is a U-shaped channel member 21 (see FIG. 1a) in which the bottom bellows bracket 15 rides during the opening and closing motions.

My attachment comprises a wire frame, which may be of steel wire, for example ⅛″ in diameter, comprising a generally rectangular front 25 from which extend backwards three wire elements 26, 27 and 28. The rectangular front section 25 defines the field of view of the camera, and in operation is positioned to bear against the patient's face. The top wire 29 of the front abuts the patient's nose, and the bottom wire 30 abuts the patient's chin. These wires may be straight as shown in FIG. 1, or slightly recessed in the center as shown at 31 in FIG. 2 to fit comfortably against the bridge of the nose and the chin. The opening of the front 25 is designed to be slightly larger than the actual field of view of the camera. Transparent cheek retractors are generally inserted in both sides of the patient's mouth to expose the teeth and gum area. The lengths of the rearwardly-extending wire elements 26, 27 and 28 are chosen so that with a suitable portrait or close-up supplemental lens fitted over the camera's standard lens 9, the full mouth area of the patient is properly in focus when my wire frame is properly mounted on the camera as will be described later and the rectangular frame 25 abutted against the patient's face.

Mounted across the top 28 and bottom 27 wire elements is a clamp 35. In the form shown, it comprises a strip of sheet metal whose ends 36 are bent over to form loops embracing the wires and enabling the clamp 37 to slide forward and backward along the wire frame. Onto the inner side of the clamp 35 is mounted a conventional flashgun accessory 37 which comprises a housing for a battery and for receiving a miniature flashbulb, such as type AG–1B, and contains a reflector 38. The flashgun is mounted at the top of the strip 35 so as not to block or interfere with the camera's field of view and is oriented to illuminate the patient's mouth area. This is necessary because the flashgun accessory designed for mounting directly on the camera body 10 is oriented in such manner as to provide insufficient light at the patient's mouth area when arranged so close to the lens. As can be seen more clearly in FIG. 2, the flashgun housing 37 has a T-shaped end 39 which fits within a correspondingly shaped slot arranged on the side of the strip 35, though it will be appreciated that other mounting arrangements can be employed.

The top wire extension 28 terminates at its rear in an eyehole 41 extending in a horizontal plane, which is designed to engage the end 17 of the upstanding post 16 as shown in FIG. 1. The bottom right-hand wire element 26 has a transverse portion 42 terminating in a threaded end 43. The bottom left-hand wire element 27 terminates also in an eyehole 44 which however extends in a vertical plane.

To assemble the attachment, the clamp 35 with attached flashgun 37 is slid forwardly to the front frame 25. Next, the transverse wire portion 42 is threaded through the U-shaped channel 21 at the bottom of the camera front 11 until the threaded end 43 appears at the other end. The transverse portion 42 is given an appropriate shape to enable it to clear other structure present in the channel. Then, the eyehole 44 is fitted over the threaded end 43 and suitably locked thereto, such as by an acorn nut 46 which engages the threaded end 43. Next, the eyehole 41 is fitted over the end portion 17 of the post 16, and finally the clamp 35 is slid along the wire elements 26 and 27 to its locking or rearmost position adjacent the camera front 11. This action, it will be noted, clamps the wire elements 27 and 28 together and anchors the eyehole 41 to the post 16.

Operation of the camera will now be described. A conventional portrait or close-up supplemental lens is fitted over the camera lens 9. The rangefinder is set for the closest position. This insures that the camera is focussed at the vicinity of the front frame 25. These Polaroid Automatic Land cameras have a film selector or lens speed control (not shown) generally at the top of the camera front 11. It has two positions—black-and-white, and color. It adjusts the lens aperture or opening to accommodate black-and-white and color film respectively. The present Polaroid Land black-and-white film has a speed of 3000 (ASA), whereas the color film has a speed of 75 (ASA). With the lens speed control in the black-and-white position, the lens aperture is set at approximately $f{:}45$; in the color position, for this slower film, the lens aperture is opened to approximately $f{:}8.8$. A fine control, known as the L/D control, enables small variations to be made in these settings. I have found that when one attempts to use this camera to obtain a close-up color photograph, especially of the mouth area of a patient, the depth of field is inadequate. In accordance with the method of my invention, in taking a color photograph using the low speed Polaroid Land color film, I set the film selector or lens speed control to the black-and-white position, which closes down the aperture increasing the depth of field. However, satisfactory pictures can still not be taken because the electric eye control does not provide sufficient light to expose properly the film.

The electric eye control in these cameras comprise a cadmium sulfide type of photoconductive cell with appropriate electric circuitry to automatically adjust the shutter speed or exposure time to expose properly the film in accordance with its speed. In accordance with my method, I provide an auxiliary diaphragm or electric eye cap, shown at 50 in FIG. 1, which is placed over the electric eye 12. The auxiliary electric eye diaphragm 50 has a small pinhole opening 51. The size of the opening 51 compared with the size of the electric eye opening 12 is in the approximate ratio of the color and black-and-white film speeds, viz., 75/3000. That is, the pinhole area is approximately $1/40$ of the normal opening of the electric eye. As a consequence, with the cap 50 in place, the reduced light input reduces the shutter speed by a factor of about $1/40$ permitting about 40 times more light to reach the film, which thus compensates for the use of the smaller lens aperture of $f{:}45$.

Then, the camera is brought to bear against the patient's face, and the shutter released in the normal way, which activates the flashgun, the exposure time being controlled automatically by the electric eye. With this technique, I have obtained excellent color photographs with the whole mouth area from the lips clear back to the rear molars in perfect focus. With a wire frame for the model 104, producing a picture of about $3\frac{3}{4}''$ x $2\frac{7}{8}''$, and the front frame area 25 about 10% oversize, the picture obtained is lifesize—neither diminished nor enlarged. To remove the attachment, the flashgun with clamp is slid forwardly, the eyehole 41 disengaged from the post 16, the acorn nut 46 removed, and then the wire element 42 removed from the channel 21, restoring the camera to its original condition.

The attachments depicted in FIGS. 1 and 2 are adapted for the model 104 and model 103 Polaroid Land cameras. FIG. 3 shows a modification suitable for attachment to the model 100, which differs from the other models in that the U-shaped channel at the bottom of the camera front is mounted sideways, leaving the back open. Thus, the transverse wire portion 60 is provided with a U-shaped bend 61 which grips opposite surfaces of the bight portion of the U-channel to clamp the transverse portion 60 to the channel. A bend 62 near the end of the wire element 27 serves a similar purpose of bearing against the front surface of the channel.

Figure 4:
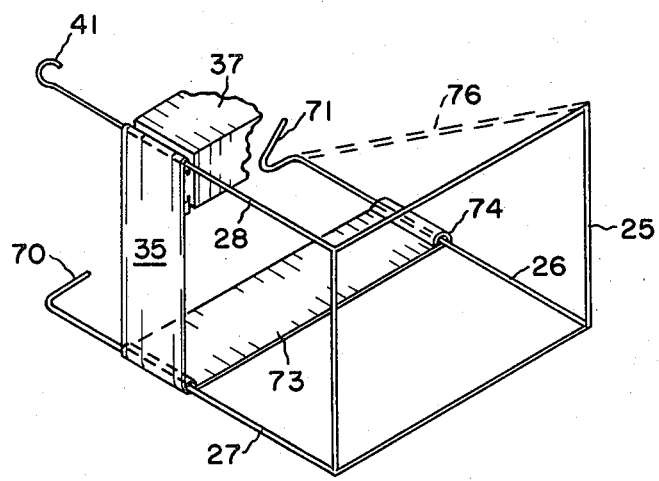

FIG. 4 shows a further modification for the model 104 or 100. In this case, the bottom wire element 27 is provided with a short transverse portion 70 for engaging the left end of the U-shaped channel 21. The other bottom wire element 26 is provided at its end with a transverse portion 71 in the form of a V for engaging the right end of the U-shaped channel 21. To lock these elements together on the camera, the clamp 35 is provided with a second horizontal strip 73 whose end at 74 embraces the wire element 26. Now, when the L-shaped clamp is slid along the wire elements 26, 27 and 28, it not only locks the wire elements 27 and 28 onto the camera, but also the wire element 26 onto the channel 21. If greater rigidity of the frame is desired, an additional wire element in the form of a supporting strut may be provided between the upper right corner of the front 25 and the end of the wire element 26, as shown in dotted lines at 76 in FIG. 4. Other suitable mounting arrangements for the attachment to mount onto the post 16 and channel 21 of the camera will be evident to those skilled in this art from the principles and embodiments above described.

While I have described my invention in connection with specific embodiments and applications, other modifications thereof will be readily apparent to those skilled in this art without departing from the spirit and scope of the invention as defined in the appended claims.

What is claimed is:

1. A close-up attachment for a camera comprising a wire frame including a plurality of front elements forming an opening having dimensions approximately defining the camera's field of view, a first rearwardly-extending element on the lower part of the frame terminating in a transverse portion adapted to be coupled to a bottom portion of the camera, a second rearwardly-extending element on the lower part of the frame adapted to be coupled to a bottom portion of the camera, a third rearwardly-extending element on the upper part of the frame adapted to be coupled to a top portion of the camera, and means coupled across the third and at least one of the first and second elements for clamping the frame to the camera.

2. A close-up attachment as set forth in claim 1 wherein a flashgun accessory is mounted on the clamping means.

3. A close-up attachment for a camera having an upstanding post along an upper portion and a channel member along a lower portion, comprising a relatively stiff wire frame including a plurality of front elements forming a generally rectangular opening having dimensions approximately defining the camera's field of view and adapted to abut the area to be photographed, a first element extending rearwardly from one lower corner of the front and terminating in a transverse portion adapted to engage one end of the channel member and thus be coupled to a lower portion of the camera, a second element extending rearwardly from the other lower corner of the front and adapted to be coupled to a bottom portion of the camera at the other end of the channel member, a third element extending rearwardly from an upper corner of the front and terminating in means adapted to engage the post along the upper portion of the camera, means coupled across the third and at least the second elements for clamping the frame to the camera, said clamping means comprising a movable member whose ends are coupled to the said third and said second elements and are adapted to move therealong, whereby when the clamping means is positioned forwardly, the first, second and third elements may be attached and detached from the camera, and when the clamping means is positioned rearwardly, the said elements are clamped to the camera, and a flashgun mounted on the clamping means and extending within the frame so as to illuminate the area to be photographed without blocking the camera's field of view.

4. A close-up attachment as set forth in claim 3 wherein the upper and lower front elements have inwardly-extending recesses.

5. A close-up attachment for a camera having an upstanding post along an upper portion and a generally U-shaped, horizontally-extending channel member along a lower portion, comprising a relatively stiff wire frame including a plurality of front elements forming a generally rectangular opening having dimensions approximately defining the camera's field of view and adapted to abut the area to be photographed, a first element extending rearwardly from one lower corner of the front and terminating in a transverse portion adapted to engage one end of the channel member and thus be coupled to a lower portion of the camera, a second element extending rearwardly from the other lower corner of the front and adapted to be coupled to a bottom portion of the camera at the other end of the channel member, a third element extending rearwardly from an upper corner of the front and terminating in an eyehole extending in a horizontal plane and adapted to engage the post along the upper portion of the camera, means coupled across the third and at least the second elements for clamping the frame to the camera, said clamping means comprising a slidable member whose ends embrace the said third and second elements and are adapted to slide therealong, whereby when the clamping means is slid forwardly, the first, second and third elements may be attached and detached from the camera, and when the clamping member is slid rearwardly, the said elements are clamped to the camera, and a flashgun mounted on the clamping means and extending within the frame along an upper region thereof so as to illuminate the area to be photographed without blocking the camera's field of view.

6. A close-up attachment as set forth in claim 5 wherein the end of the first element is bent in the form of a V to engage the channel, the end of the second element has a transverse portion to engage the channel, and the clamping means is L-shaped and slidably engages the first, second and third elements.

7. A close-up attachment as set forth in claim 5 wherein the transverse portion of the first element extends across the width of the frame and terminates in a threaded end, and the second element terminates in an eyehole for engaging the threaded end.

8. A close-up attachment as set forth in claim 7 wherein the end of the transverse portion opposite to the threaded end has a U-shaped loop to engage a wall of the channel, and a portion of the second element near the eyehole has a bend also to engage a wall of the channel.

References Cited

UNITED STATES PATENTS

| | | | |
|---|---|---|---|
| 2,185,508 | 1/1940 | Kunze | 95—1.1 |
| 2,403,892 | 7/1946 | McFarlane et al. | 95—1.1 XR |
| 2,667,825 | 2/1954 | Nicholas | 95—11 |
| 2,942,537 | 6/1960 | Zimmerman | 95—1.1 |

NORTON ANSHER, *Primary Examiner.*

F. L. BRAUN, *Assistant Examiner.*